(12) United States Patent
Park

(10) Patent No.: US 7,594,147 B2
(45) Date of Patent: Sep. 22, 2009

(54) METHOD AND APPARATUS FOR RECORDING DATA ON AND REPRODUCING DATA FROM A RECORDING MEDIUM AND THE RECORDING MEDIUM

(75) Inventor: Yong Cheol Park, Gwachon-si (KR)

(73) Assignee: LG Electronics, Inc., Seoul (KR)

( * ) Notice: Subject to any disclaimer, the term of this patent is extended or adjusted under 35 U.S.C. 154(b) by 0 days.

(21) Appl. No.: 12/314,736

(22) Filed: Dec. 16, 2008

(65) Prior Publication Data
US 2009/0122671 A1 May 14, 2009

Related U.S. Application Data

(63) Continuation of application No. 11/193,532, filed on Aug. 1, 2005, now Pat. No. 7,478,288.

(60) Provisional application No. 60/592,525, filed on Aug. 2, 2004.

(30) Foreign Application Priority Data
Oct. 25, 2004 (KR) .................. 10-2004-0085289

(51) Int. Cl.
*G11C 29/00* (2006.01)
(52) U.S. Cl. .............. 714/710; 369/53.17; 369/47.1
(58) Field of Classification Search .......... 369/53.15, 369/47.14, 53.17, 47.1; 714/42, 5, 718, 710
See application file for complete search history.

(56) References Cited

U.S. PATENT DOCUMENTS 4,558,446 A  12/1985  Banba et al.
4,733,386 A   3/1988  Shimoi
4,807,205 A   2/1989  Picard
4,963,866 A  10/1990  Duncan
5,051,849 A * 9/1991  Fukushima et al. ......... 360/69
5,068,842 A  11/1991  Naito
5,111,444 A   5/1992  Fukushima et al.

(Continued)

FOREIGN PATENT DOCUMENTS

CN       1134017       10/1996

(Continued)

OTHER PUBLICATIONS

Chinese Patent Office Action dated Dec. 5, 2008 for counterpart Chinese application.

(Continued)

*Primary Examiner*—David Ton
(74) *Attorney, Agent, or Firm*—Harness, Dickey & Pierce, P.L.C.

(57) ABSTRACT

In an embodiment of the method of recording data on a recording medium, a next recordable position of a recording range is notified to a host. A replacement for data requested to be recorded is performed at a first area of the recording range by recording sequentially the data requested onto a second area starting from the next recordable position instead of the first area. The first area has recorded data and the second area does not have recorded data. A management information entry is recorded onto a temporary defect management area of the recording medium. The management information entry indicates the first and second areas and includes first and second status indicators indicating a status of the management information entry. The first status indicator indicates that the replacement is performed and the second status indicator indicates a type of the replacement.

15 Claims, 10 Drawing Sheets

U.S. PATENT DOCUMENTS

| | | |
|---|---|---|
| 5,210,734 A | 5/1993 | Sakurai |
| 5,235,585 A | 8/1993 | Bish et al. |
| 5,237,553 A | 8/1993 | Fukushima et al. |
| 5,247,494 A | 9/1993 | Ohmo et al. |
| 5,319,626 A | 6/1994 | Ozaki et al. |
| 5,404,357 A | 4/1995 | Ito et al. |
| 5,442,611 A | 8/1995 | Hosaka |
| 5,448,728 A | 9/1995 | Takano et al. |
| 5,475,820 A | 12/1995 | Natrasevschi et al. |
| 5,481,519 A | 1/1996 | Hosoya |
| 5,495,466 A | 2/1996 | Dohmeier et al. |
| 5,528,571 A | 6/1996 | Funahashi et al. |
| 5,553,045 A | 9/1996 | Obata |
| 5,577,194 A | 11/1996 | Wells et al. |
| 5,608,715 A | 3/1997 | Yokogawa et al. |
| 5,633,764 A * | 5/1997 | Ohta ............................. 360/7 |
| 5,715,221 A | 2/1998 | Ito et al. |
| 5,720,030 A | 2/1998 | Kamihara et al. |
| 5,740,435 A | 4/1998 | Yamamoto et al. |
| 5,745,444 A | 4/1998 | Ichikawa et al. |
| 5,799,212 A | 8/1998 | Ohmori |
| 5,802,028 A | 9/1998 | Igarashi |
| 5,805,536 A | 9/1998 | Gage et al. |
| 5,848,038 A | 12/1998 | Igarashi |
| 5,867,455 A | 2/1999 | Miyamoto et al. |
| 5,878,020 A | 3/1999 | Takahashi |
| 5,890,206 A | 3/1999 | Koike |
| 5,914,928 A | 6/1999 | Takahashi |
| 6,058,085 A | 5/2000 | Obata |
| 6,118,608 A | 9/2000 | Kakihara et al. |
| 6,138,203 A | 10/2000 | Inokuchi et al. |
| 6,160,778 A | 12/2000 | Ito et al. |
| 6,189,118 B1 | 2/2001 | Sasaki et al. |
| 6,233,654 B1 | 5/2001 | Aoki et al. |
| 6,292,445 B1 | 9/2001 | Ito et al. |
| 6,341,109 B1 | 1/2002 | Kayanuma |
| 6,341,278 B1 | 1/2002 | Yamamoto et al. |
| 6,373,800 B1 | 4/2002 | Takahashi |
| 6,405,332 B1 | 6/2002 | Bando et al. |
| 6,414,923 B1 | 7/2002 | Park et al. |
| 6,447,126 B1 | 9/2002 | Hornbeck |
| 6,466,532 B1 | 10/2002 | Ko |
| 6,469,978 B1 | 10/2002 | Ohata et al. |
| 6,477,126 B1 | 11/2002 | Park et al. |
| 6,480,446 B1 | 11/2002 | Ko |
| 6,493,301 B1 | 12/2002 | Park |
| 6,529,458 B1 | 3/2003 | Shin |
| 6,542,450 B1 | 4/2003 | Park |
| 6,564,345 B1 | 5/2003 | Kim et al. |
| 6,581,167 B1 | 6/2003 | Gotoh et al. |
| 6,594,209 B2 | 7/2003 | Ijtsma et al. |
| 6,606,285 B1 | 8/2003 | Ijtsma et al. |
| 6,615,363 B1 | 9/2003 | Fukasawa |
| 6,631,106 B1 | 10/2003 | Numata et al. |
| 6,633,724 B1 | 10/2003 | Hasegawa et al. |
| 6,667,939 B1 | 12/2003 | Miyamoto |
| 6,671,249 B2 | 12/2003 | Horie |
| 6,697,306 B2 | 2/2004 | Sako |
| 6,714,502 B2 | 3/2004 | Ko et al. |
| 6,724,701 B2 | 4/2004 | Ijtsma et al. |
| 6,738,341 B2 | 5/2004 | Ohata et al. |
| 6,754,860 B2 | 6/2004 | Kim et al. |
| 6,760,288 B2 | 7/2004 | Ijtsma et al. |
| 6,763,429 B1 | 7/2004 | Hirayama |
| 6,766,418 B1 | 7/2004 | Alexander et al. |
| 6,788,631 B1 | 9/2004 | Park et al. |
| 6,795,389 B1 | 9/2004 | Nishiuchi et al. |
| 6,804,797 B2 | 10/2004 | Ko et al. |
| 6,826,140 B2 | 11/2004 | Brommer et al. |
| 6,842,580 B1 | 1/2005 | Ueda et al. |
| 6,845,069 B2 | 1/2005 | Nakahara et al. |
| 6,883,111 B2 | 4/2005 | Yoshida et al. |
| 6,918,003 B2 | 7/2005 | Sasaki |
| 6,934,236 B2 | 8/2005 | Lee et al. |
| 6,999,398 B2 | 2/2006 | Yamamoto et al. |
| 7,002,882 B2 | 2/2006 | Takahashi |
| 7,027,059 B2 | 4/2006 | Hux et al. |
| 7,027,373 B2 | 4/2006 | Ueda et al. |
| 7,042,825 B2 | 5/2006 | Yamamoto et al. |
| 7,050,701 B1 | 5/2006 | Sasaki et al. |
| 7,092,334 B2 | 8/2006 | Choi et al. |
| 7,123,556 B2 | 10/2006 | Ueda et al. |
| 7,149,930 B2 | 12/2006 | Ogawa et al. |
| 7,161,879 B2 | 1/2007 | Hwang et al. |
| 7,184,377 B2 | 2/2007 | Ito et al. |
| 7,188,271 B2 | 3/2007 | Park et al. |
| 7,233,550 B2 | 6/2007 | Park et al. |
| 7,236,687 B2 | 6/2007 | Kato et al. |
| 7,272,086 B2 | 9/2007 | Hwang et al. |
| 7,289,404 B2 | 10/2007 | Park et al. |
| 7,296,178 B2 | 11/2007 | Yoshida et al. |
| 7,313,066 B2 | 12/2007 | Hwang et al. |
| 7,327,654 B2 | 2/2008 | Hwang et al. |
| 7,379,402 B2 | 5/2008 | Ko et al. |
| 2001/0009537 A1 | 7/2001 | Park |
| 2001/0011267 A1 | 8/2001 | Kihara et al. |
| 2001/0026511 A1 | 10/2001 | Ueda et al. |
| 2001/0043525 A1 | 11/2001 | Ito et al. |
| 2002/0025138 A1 | 2/2002 | Isobe et al. |
| 2002/0097665 A1 | 7/2002 | Ko et al. |
| 2002/0097666 A1 | 7/2002 | Ko et al. |
| 2002/0099950 A1 | 7/2002 | Smith |
| 2002/0136118 A1 | 9/2002 | Takahashi |
| 2002/0136134 A1 | 9/2002 | Ito et al. |
| 2002/0136537 A1 | 9/2002 | Takahashi |
| 2002/0159382 A1 | 10/2002 | Ohata et al. |
| 2002/0161774 A1 | 10/2002 | Tol et al. |
| 2002/0176341 A1 | 11/2002 | Ko et al. |
| 2003/0072236 A1 | 4/2003 | Hirotsune et al. |
| 2003/0095482 A1 | 5/2003 | Hung et al. |
| 2003/0126527 A1 | 7/2003 | Kim et al. |
| 2003/0135800 A1 | 7/2003 | Kim et al. |
| 2003/0137909 A1 | 7/2003 | Ito et al. |
| 2003/0137910 A1 | 7/2003 | Ueda et al. |
| 2003/0142608 A1 | 7/2003 | Yamamoto et al. |
| 2003/0149918 A1 | 8/2003 | Takaichi |
| 2003/0173669 A1 | 9/2003 | Shau |
| 2003/0198155 A1 | 10/2003 | Go et al. |
| 2003/0237024 A1 | 12/2003 | Ogawa et al. |
| 2004/0001408 A1 | 1/2004 | Propps et al. |
| 2004/0004917 A1 | 1/2004 | Lee |
| 2004/0062159 A1 | 4/2004 | Park et al. |
| 2004/0062160 A1 | 4/2004 | Park et al. |
| 2004/0076096 A1 | 4/2004 | Hwang et al. |
| 2004/0090888 A1 | 5/2004 | Park et al. |
| 2004/0105363 A1 | 6/2004 | Ko et al. |
| 2004/0114474 A1 | 6/2004 | Park et al. |
| 2004/0120233 A1 | 6/2004 | Park et al. |
| 2004/0125715 A1 | 7/2004 | Lee et al. |
| 2004/0125716 A1 | 7/2004 | Ko et al. |
| 2004/0125717 A1 | 7/2004 | Ko et al. |
| 2004/0136292 A1 | 7/2004 | Park et al. |
| 2004/0145980 A1 | 7/2004 | Park et al. |
| 2004/0158768 A1 | 8/2004 | Park et al. |
| 2004/0174782 A1 | 9/2004 | Lee et al. |
| 2004/0174785 A1 | 9/2004 | Ueda et al. |
| 2004/0179445 A1 | 9/2004 | Park et al. |
| 2004/0179458 A1 | 9/2004 | Hwang et al. |
| 2004/0223427 A1 | 11/2004 | Kim et al. |
| 2004/0246851 A1 | 12/2004 | Hwang et al. |
| 2005/0007910 A1 | 1/2005 | Ito et al. |
| 2005/0008346 A1 | 1/2005 | Noguchi et al. |
| 2005/0025007 A1 | 2/2005 | Park |
| 2005/0047294 A1 | 3/2005 | Park |

| | | | |
|---|---|---|---|
| 2005/0050402 A1 | 3/2005 | Koda et al. |
| 2005/0052972 A1 | 3/2005 | Park |
| 2005/0052973 A1 | 3/2005 | Park |
| 2005/0055500 A1 | 3/2005 | Park |
| 2005/0060489 A1 | 3/2005 | Park |
| 2005/0068877 A1 | 3/2005 | Yeo |
| 2005/0083740 A1 | 4/2005 | Kobayashi |
| 2005/0083767 A1 | 4/2005 | Terada et al. |
| 2005/0083830 A1 | 4/2005 | Martens et al. |
| 2005/0195716 A1 | 9/2005 | Ko et al. |
| 2005/0207262 A1 | 9/2005 | Terada et al. |
| 2005/0289389 A1 | 12/2005 | Yamagami et al. |
| 2006/0077827 A1 | 4/2006 | Takahashi |
| 2006/0195719 A1 | 8/2006 | Ueda et al. |
| 2006/0203635 A1 | 9/2006 | Ko et al. |
| 2006/0203638 A1 | 9/2006 | Ko et al. |
| 2006/0203684 A1 | 9/2006 | Ko et al. |
| 2006/0227694 A1 | 10/2006 | Woerlee et al. |
| 2007/0294571 A1 | 12/2007 | Park et al. |
| 2008/0046780 A1 | 2/2008 | Shibuya et al. |

FOREIGN PATENT DOCUMENTS

| | | |
|---|---|---|
| CN | 1140897 | 1/1997 |
| CN | 1227950 | 9/1999 |
| CN | 1273419 | 11/2000 |
| CN | 1675708 | 9/2005 |
| CN | 1685426 | 10/2005 |
| DE | 199 54 054 | 6/2000 |
| EP | 0 314 186 | 5/1989 |
| EP | 0 325 823 | 8/1989 |
| EP | 0 350 920 | 1/1990 |
| EP | 0 472 484 | 2/1992 |
| EP | 0 477 503 | 4/1992 |
| EP | 0 464 811 | 8/1992 |
| EP | 0 556 046 | 8/1993 |
| EP | 0 871 172 | 10/1998 |
| EP | 0 908 882 | 4/1999 |
| EP | 0 974 967 | 1/2000 |
| EP | 0 989 554 | 3/2000 |
| EP | 0 997 904 | 5/2000 |
| EP | 1 043 723 | 10/2000 |
| EP | 1 132 914 | 9/2001 |
| EP | 1 148 493 | 10/2001 |
| EP | 1 152 414 | 11/2001 |
| EP | 1 026 681 | 9/2002 |
| EP | 1 239 478 | 9/2002 |
| EP | 1 274 081 | 1/2003 |
| EP | 1 298 659 | 4/2003 |
| EP | 1 329 888 | 7/2003 |
| EP | 1 347 452 | 9/2003 |
| EP | 1 547 065 | 4/2004 |
| EP | 1 573 723 | 9/2004 |
| EP | 1 623 422 | 11/2004 |
| EP | 1 564 740 | 8/2005 |
| EP | 1 612 790 | 1/2006 |
| GB | 2 356 735 | 5/2001 |
| JP | 63-091842 | 4/1988 |
| JP | 1-263955 | 10/1989 |
| JP | 2-023417 | 1/1990 |
| JP | 5-274814 | 10/1993 |
| JP | 6-349201 | 12/1994 |
| JP | 8-096522 | 4/1996 |
| JP | 9-145634 | 6/1997 |
| JP | 9-231053 | 9/1997 |
| JP | 10-050005 | 2/1998 |
| JP | 10-050032 | 2/1998 |
| JP | 10-187356 | 7/1998 |
| JP | 10-187357 | 7/1998 |
| JP | 10-187358 | 7/1998 |
| JP | 10-187359 | 7/1998 |
| JP | 10-187360 | 7/1998 |
| JP | 10-187361 | 7/1998 |
| JP | 11-110888 | 4/1999 |
| JP | 11-203792 | 7/1999 |
| JP | 2000-090588 | 3/2000 |
| JP | 2000-149449 | 5/2000 |
| JP | 2000-195178 | 7/2000 |
| JP | 2000-215612 | 8/2000 |
| JP | 2000-285607 | 10/2000 |
| JP | 2001-023317 | 1/2001 |
| JP | 2001-069440 | 3/2001 |
| JP | 2001-110168 | 4/2001 |
| JP | 2001-351334 | 12/2001 |
| JP | 2001-357623 | 12/2001 |
| JP | 2002-015507 | 1/2002 |
| JP | 2002-015525 | 1/2002 |
| JP | 2002-056619 | 2/2002 |
| JP | 2002-215612 | 8/2002 |
| JP | 2002-245723 | 8/2002 |
| JP | 2002-288938 | 10/2002 |
| JP | 2002-329321 | 11/2002 |
| JP | 2002-352522 | 12/2002 |
| JP | 2004-280864 | 10/2004 |
| JP | 2004-280865 | 10/2004 |
| JP | 2005-004912 | 1/2005 |
| JP | 2005-535993 | 11/2005 |
| JP | 2005-538490 | 12/2005 |
| JP | 2005-538491 | 12/2005 |
| JP | 2006-519445 | 8/2006 |
| KR | 10-2004-0015602 | 11/2004 |
| TW | 371752 | 10/1999 |
| TW | 413805 | 12/2000 |
| WO | WO 84/00628 | 2/1984 |
| WO | WO 96/30902 | 10/1996 |
| WO | WO 97/22182 | 6/1997 |
| WO | WO 00/54274 | 9/2000 |
| WO | WO 01/22416 | 3/2001 |
| WO | WO 01/93035 | 12/2001 |
| WO | WO 03/007296 | 1/2003 |
| WO | WO 03/025924 | 3/2003 |
| WO | WO 03/079353 | 9/2003 |
| WO | 2004/015707 | 2/2004 |
| WO | WO 2004/015708 | 2/2004 |
| WO | WO 2004/029668 | 4/2004 |
| WO | WO 2004/029941 | 4/2004 |
| WO | WO 2004/034396 | 4/2004 |
| WO | WO 2004/036561 | 4/2004 |
| WO | WO 2004/053872 | 6/2004 |
| WO | WO 2004/053874 | 6/2004 |
| WO | WO 2004/068476 | 8/2004 |
| WO | WO 2004/079731 | 9/2004 |
| WO | WO 2004/079740 | 9/2004 |
| WO | WO 2004/081926 | 9/2004 |
| WO | WO 2004/093035 | 10/2004 |
| WO | WO 2004/100155 | 11/2004 |
| WO | WO 2004/100156 | 11/2004 |
| WO | WO 2005/004123 | 1/2005 |
| WO | WO 2005/004154 | 1/2005 |

OTHER PUBLICATIONS

Search Report dated Mar. 4, 2009 by European Patent Office for a counterpart European application.
International Search Report dated Dec. 19, 2005.
"JIS Handbook Data Processing for Hardware," Japanese Standards Association Inc., Japan, Apr. 21, 1999, pp. 1064-1070.
International Search Report and Written Opinion dated Aug. 31, 2004.
International Search Report and Written Opinion dated Jan. 13, 2006.
International Search Report and Written Opinion dated Mar. 8, 2007.
European Search Report dated Jun. 5, 2008.
Russian Office Action dated Jun. 26, 2008 with English Translation.

* cited by examiner

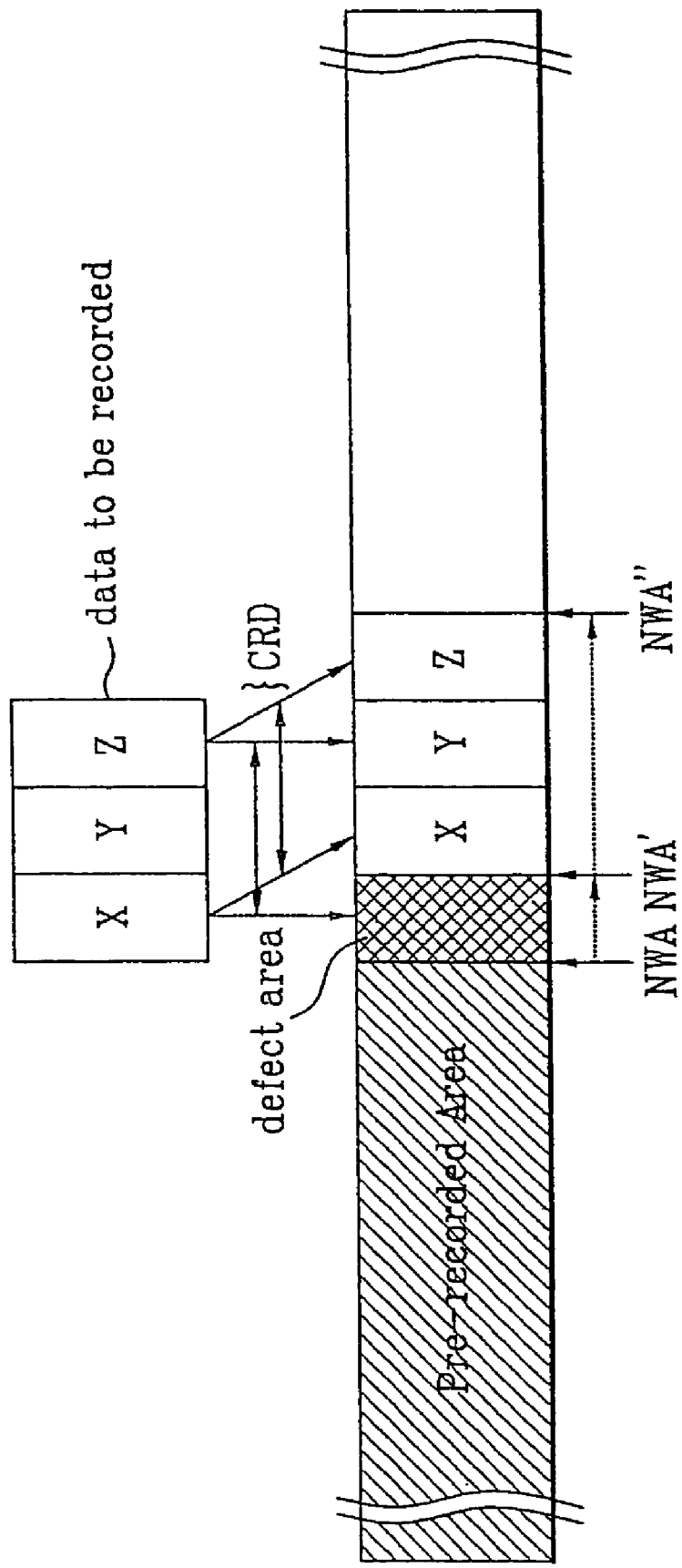

METHOD AND APPARATUS FOR RECORDING DATA ON AND REPRODUCING DATA FROM A RECORDING MEDIUM AND THE RECORDING MEDIUM

CROSS-REFERENCE TO RELATED APPLICATIONS

This application is a continuation of, and claims priority to U.S. patent application Ser. No. 11/193,532, filed Aug. 1, 2005 now U.S. Pat. No. 7,478,288 and further claims priority to U.S. Provisional Application No. 60/592,525, filed on Aug. 2, 2004, and to Korean Application No. 10-2004-0085289, filed on Oct. 25, 2004, the contents of which are hereby incorporated by reference in their entirety.

BACKGROUND OF THE INVENTION

1. Field of the Invention

The present invention relates to recording media, and methods and apparatuses associated therewith.

2. Discussion of the Related Art

A new type of high density optical disc, such as a Blu-ray RE-writable disc (BD-RE), that can record and store high definition audio and video data for a long period of time, is being developed. As shown in FIG. 1, the BD-RE has a lead-in area, a data zone, and a lead-out area. An inner spare area (ISA) and an outer spare area (OSA) are respectively allocated at a fore end and a rear end of the data zone. A recording unit of the BD-RE is a cluster. Referring to FIG. 1, whether or not a defect area exists within the data zone can be detected during the recording of the data. When a defect area is detected, replacement recording operations are performed. For example, the data that is intended to be recorded in the defect area is recorded in a spare area (e.g., the inner spare area (ISA)). Then, position information of the detected defect area and the replacement recorded spare area are recorded and stored as management information in a defect list (DFL) of a disc management area (DMA) located within the lead-in area.

During a read operation of this data, the data recorded in the spare area is read and reproduced, instead of the data of the defect area, by accessing the DFL; thereby preventing a data recording/reproducing error from occurring.

A write-once recordable blu-ray disc (BD-WO) is also under development. Unlike a rewritable disc, data can only be recorded once in the entire area of a write-once optical disc; and data cannot be physically overwritten in the write-once optical disc. Nevertheless, there may occur instances, where it would be desirable to edit or partially modify recorded data. For example, for simplicity of use of the host or the user, virtual overwriting of the data may be desirable.

SUMMARY OF THE INVENTION

In an embodiment of the method of recording data on a recording medium having a user data area divided into one or more recording ranges, a next recordable position of a recording range is notified to a host. A replacement for data requested to be recorded is performed at a first area of the recording range by recording sequentially the data requested onto a second area starting from the next recordable position instead of the first area. The first area has recorded data and the second area does not have recorded data. A management information entry is recorded onto a temporary defect management area of the recording medium. The management information entry indicates the first and second areas and includes first and second status indicators indicating a status of the management information entry. The first status indicator indicates that the replacement is performed and the second status indicator indicates a type of the replacement.

In one embodiment, the type of the replacement is one of single data unit replacement type and continuous data unit replacement type. A data unit is a cluster.

Also, the management information entry indicates the first and second areas by including a first physical sector number of the first area and a first physical sector number of the second area. If the second status indicator indicates the type of the replacement is continuous, then the recording step records a first management information entry and a second management information entry. The first management information entry includes information indicating a first data unit in the first area and a first data unit in the second area and the second management information entry includes information indicating a last data unit in the first area and a last data unit in the second area.

In one embodiment, the next recordable position is an unrecorded cluster directly subsequent after the last sector having recorded data in the recording range. The next recordable position is moved in accordance with the performing step without notifying to the host.

In an embodiment of the apparatus for recording data onto a recording medium having a user data area divided into one or more recording ranges, a interface unit is configured to communicate with a external host. A pickup is configured to write/read data to/from the recording medium directly. A data processor is configured to receive and recover a signal from the recording medium or modulate a signal to be recorded into a signal that can be written on the recording medium. A servo is configured to control the pickup to read/write accurately a signal from/to the recording medium. A memory is configured to store information temporarily.

Also, a microcomputer is configured to notify a next recordable position of a recording range to a host and control the interface unit, the pickup, the data processor, the servo and the memory such that the apparatus performs a replacement for data requested to be recorded at a first area of the recording range by recording sequentially the data requested onto a second area starting from the next recordable position instead of the first area. The first area has recorded data and the second area does not have recorded data.

Also, the apparatus records onto a temporary defect management area of the recording medium a management information entry. The management information entry indicates the first and second areas and includes first and second status indicators indicating a status of the management information entry. The first status indicator indicates that the replacement is performed and the second status indicator indicates a type of the replacement.

In one embodiment, if the second status indicator indicates the type of the replacement is continuous, the microcomputer is configured to control the interface unit, the pickup, the data processor, the servo and the memory such that the apparatus records a first management information entry and a second management information entry.

Also, the microcomputer is configured to notify the host of an address of an unrecorded cluster directly subsequent after the last sector having recorded data in the recording range as the next recordable position of the recording range. The microcomputer is configured to move the next recordable position without notifying the host in accordance with the replacement. Furthermore, the microcomputer is configured to receive from the host a command requesting the apparatus to record data at the first area, and control the interface unit, the pickup, the data processor, the servo and the memory in response to the command from the host.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings:

FIGS. 7A to 7C illustrate methods for logical overwriting and for managing defects in the write-once optical disc according to embodiments of the present invention.

DETAILED DESCRIPTION OF EXAMPLE EMBODIMENTS

Reference will now be made in detail to example embodiments of the present invention, which are illustrated in the accompanying drawings. Wherever possible, the same reference numbers will be used throughout the drawings to refer to the same or like parts.

Figure 1:
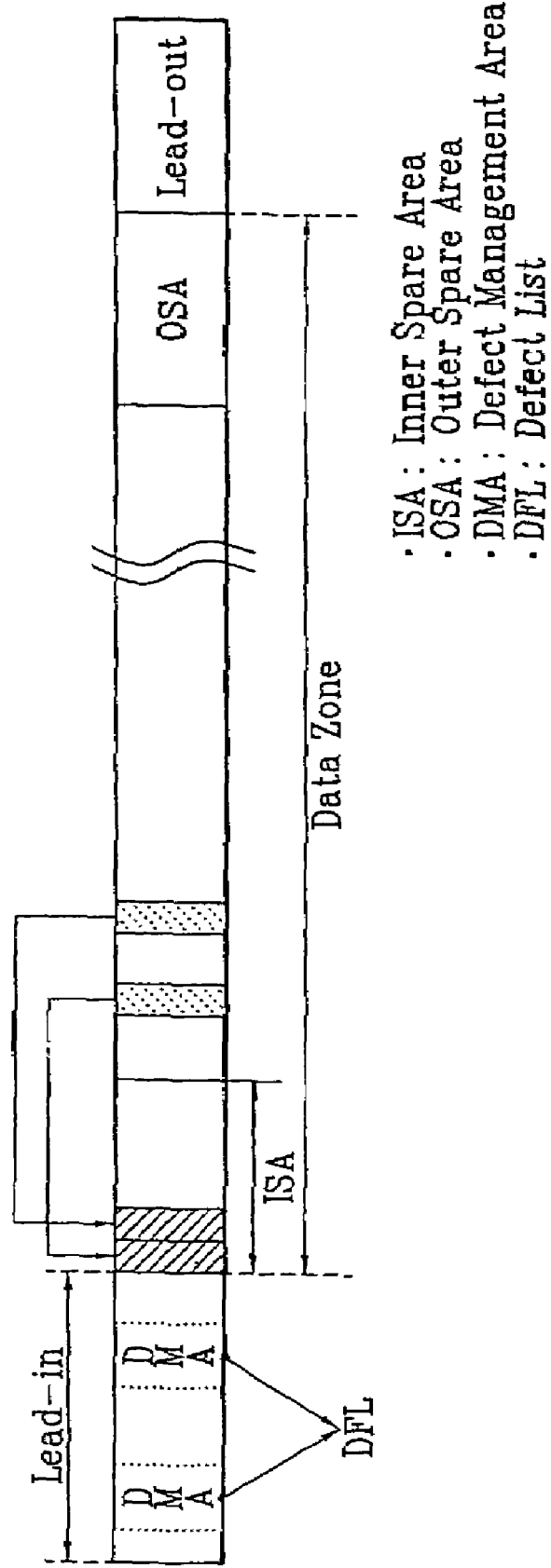
FIG. 1 illustrates a structure of a general re-writable optical disc and a method for managing defects.
Figure 2:
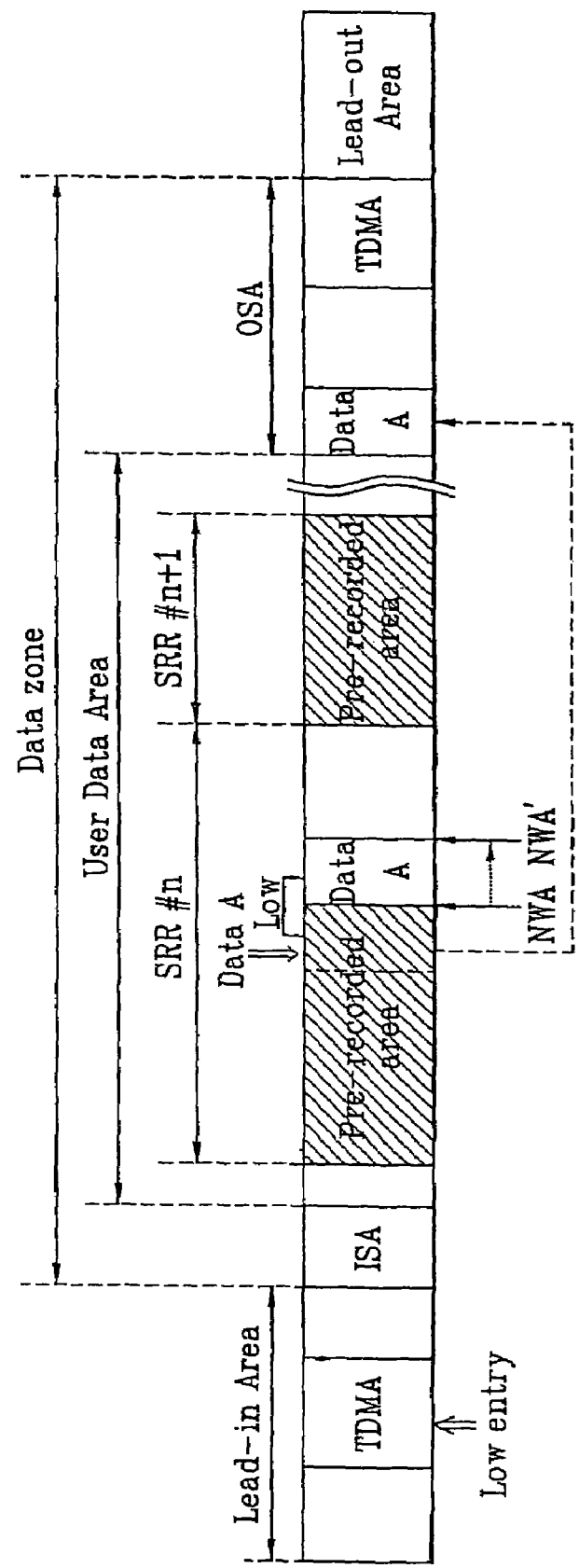
FIG. 2 illustrates a logical overwriting method for a write-once optical disc according to an embodiment of the present invention.

FIG. 2 illustrates a logical overwriting method for a write-once high density optical disc according to an embodiment of the present invention. As shown, the write-once high density optical disc includes a lead-in area, a data zone, and a lead-out area. The data zone includes an inner spare area (ISA), an outer spare area (OSA), and a user data area. The lead-in area is used as an area for recording diverse management information for recording/reproducing data on/from the optical disc. The lead-in area may be provided with a temporary disc management area (TDMA), which is an area, generally of fixed size, for recording defect management information and recording management information for the optical disc. A separate additional TDMA within a spare may also be allocated for defects that may frequently occur during the use of the optical disc and for updating the recording management information.

In a write-once optical disc having the above-described structure, data recording may be categorized into two types: a sequential recording mode (SRM) type and a random recording mode (RRM) type. In the SRM type, in order to facilitate recording of data on the optical disc, the user data area in which actual user data is recorded is divided into a plurality of consecutive recording areas for recording data. Each of the divided plurality of consecutive recording areas is referred to as a Sequential Recording Range (SRR). The recording of data in a SRR is performed on a next recordable (or writable) non-recorded cluster. An address of the next recordable non-recorded cluster in an SRR is referred to as a Next Writable Address (NWA). More specifically, in the SRR, a directly subsequent unrecorded area after a recorded area becomes the NWA, and the recording of data begins from the NWA. Therefore, when sequential recording of data is performed starting from the NWA, the NWA may dynamically increase in accordance with the recording of the data.

In the above-described SRM type, a command for writing (or overwriting) data in a recorded area or portion within a SRR (SRR #n) may be given (or made) by a user or a host. In this case, due to the characteristic of the write-once optical disc, physical writing of the data can only be performed once, and so writing (or recording) of data on a recorded area is not possible. In other words, overwriting of data cannot be physically performed. According to embodiments of the present invention, in the SRM type of the recordable high density optical disc, when an overwriting command requesting data to be overwritten on a recorded area is given (or made), the data that is to be written on the recorded portion is instead recorded beginning at a NWA of the same SRR, beginning at a NWA of another SRR, or in a spare area. This is referred to as a Logical Overwrite (LOW).

For example, as shown in FIG. 2, when a writing (or recording) command for data A of a recorded data area within an SRR (SRR #n) is transmitted, the data A that is to be recorded in the pre-recorded data area is either recorded at a next writable area, which is the NWA, of the SRR (SRR #n) including the recorded data area or, alternatively, recorded in a spare area (e.g., the OSA). The area is pre-recorded in the sense that the area was recorded on prior to recording of data A. When the data is recorded in the NWA of the SRR (SRR #n), a next writable area from the SRR (SRR #n) becomes NWA'. After performing the replacement recording of the data, as described above, information on the position of the area in which data was to be overwritten and the replacement recorded area is recorded in the TDMA as a LOW entry. The LOW entry is broadly categorized into two types: a Re-Allocated Defect (RAD) type and a Continuous Re-allocated Defect (CRD) type.

Figure 3:
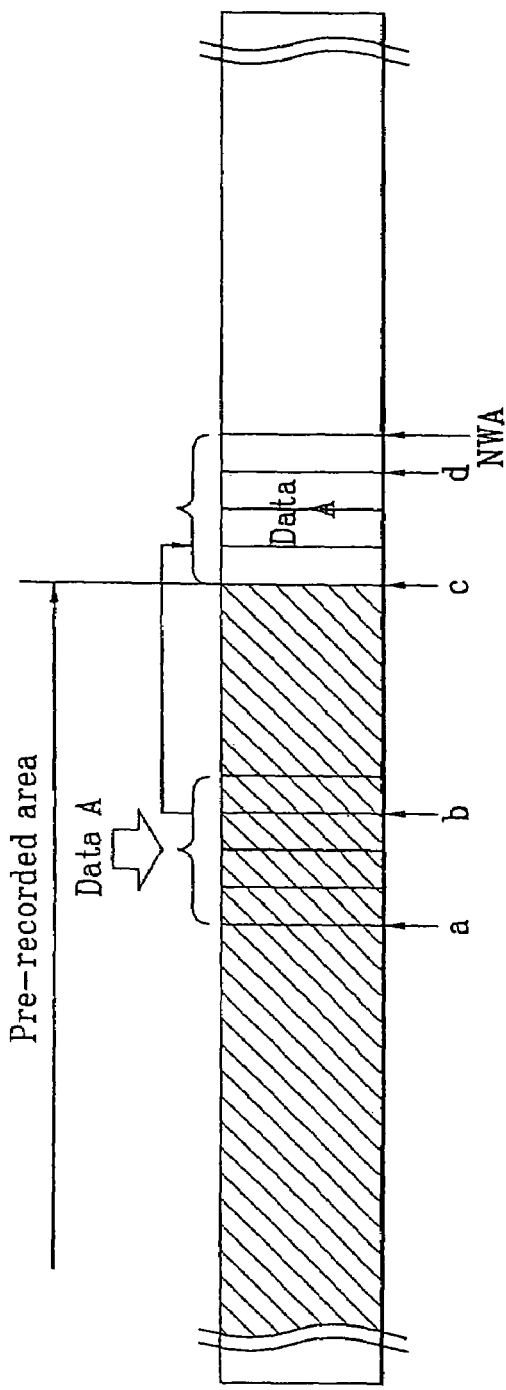
FIG. 3 illustrates a method for recording a LOW entry according to an embodiment of the present invention.

FIG. 3 illustrates a method for recording a LOW entry according to an embodiment of the present invention. Referring to FIG. 3, the LOW entry may be expressed (or described) as a CRD type entry, which is a replacement type for consecutive defective clusters or overwriting clusters. More specifically, when a command for overwriting data A on the pre-recorded area is transmitted, data A is replacement recorded on a replacement area. Thereafter, if data A is intended to be recorded in a plurality of clusters, the LOW entry is registered as the CRD type. In case of the CRD type, the entry recorded in the TDMA is expressed (or recorded) by using two DFL entries.

As shown, each DFL entry includes a "Status 1" field, a "Defective Cluster first PSN" field, a "Status 2" field, and a "Replacement Cluster first PSN" field. When the "Status 1" field is recorded as '0000', this indicates either a RAD type DFL entry or a CRD type DFL entry, wherein replacement recording is completed normally in the defect area or the overwriting area. When the "Status 1" field is recorded as '0001', this indicates a Non-Reallocatable Defect (NRD) type DFL entry, wherein neither the defect area nor the overwriting area has a designated replacement area for the replacement recording. Namely, the position of the defect is noted in the entry, but since no replacement recording took place, any replacement position information in the entry is meaningless.

Position information of the cluster wherein a defect has occurred or the cluster that has been overwritten (e.g., by the LOW process) is recorded in the "Defective Cluster first PSN" field. The position information is recorded as a first physical sector number (PSN) of the corresponding cluster.

When '0000' is recorded in the "Status 2" field, this indicates that defect replacement or overwriting replacement has occurred in one cluster. When '0001' is recorded in the "Status 2" field, this indicates that the DFL entry provides position information for the start (or beginning) of a plurality of consecutive defective or overwriting clusters. When '0010' is recorded in the "Status 2" field, this indicates that the DFL entry provides position information for the end of the plurality of consecutive defective or overwriting clusters.

The position information of a replacement recorded area of a defective area or an overwriting area is recorded in the "Replacement Cluster first PSN" field, wherein the information is recorded as a first physical sector number (PSN) of the corresponding cluster.

In view of the above, when '0001' is recorded in the "Status 2" field and "0000" in the "Status 1" field, (i) the "Defective Cluster first PSN" indicates the PSN of a first defective cluster in a series of defective clusters or a series of overwriting clusters and (ii) the "Replacement Cluster first PSN" indicates the PSN of a first cluster in the series of clusters replacing the defective or overwritten clusters. And, when '0010' is recorded in the "Status 2" field and "00000" in the "Status 1" field, (i) the "Defective Cluster first PSN" indicates the PSN of a last defective cluster in a series of defective clusters or a series of overwritten clusters and (ii) the "Replacement Cluster first PSN" indicates the PSN of a last cluster in the series of clusters replacing the defective or overwritten clusters.

Each DFL entry is formed of 8 bytes (64 bits), wherein 4 bits are allocated for each of the "Status" fields and 28 bits are allocated for each of the "Defective Cluster first PSN" field and the "Replacement Cluster first PSN" field. In an example of an overwriting method using an entry format having the above-described structure, shown in FIG. 3, a '0000' bit indicating that replacement recording has been performed is recorded in the "Status 1" field of the first entry (DFL entry 1), and a first physical sector number (PSN) 'a' of the first cluster is recorded in the "Defective Cluster first PSN" field. Additionally, a '0001' bit indicating a start (or beginning) of consecutive defective or overwritten clusters is recorded in the "Status 2" field. And, a first physical sector number (PSN) 'c' of a replacement recorded area of the overwriting area is recorded in the "Replacement Cluster first PSN" field.

Moreover, a '0000' bit indicating that replacement recording has been performed is recorded in the "Status 1" field of the second entry (DFL entry 2), and a first physical sector number (PSN) 'b' of the last cluster, among the overwriting clusters, is recorded in the "Defective Cluster first PSN" field. Additionally, a '0010' bit indicating an end of consecutive defective clusters is recorded in the "Status 2" field. And, a first physical sector number (PSN) 'd' of the last cluster, among the replacement recorded areas of the overwriting area, is recorded in the "Replacement Cluster first PSN" field. Therefore, when a host requires the reproduction of the area a-b, in accordance with a user request, the area c-d is reproduced by referring to the LOW entry information, which is recorded in the TDMA. As described above, in the method for expressing (or describing) the management information on overwriting using two DFL entries (DFL entry 1, DFL entry 2), for consecutive defective or overwriting clusters, the two entries are collectively referred to as a CRD entry.

Meanwhile, the replacement type for a defective or overwriting cluster may be expressed as a single DFL entry, and the DFL entry will be referred to as an RAD entry. Furthermore, the replacement type for the defective or overwriting cluster is referred to as a RAD type. In the SRM type recording method, and when the replacement recording for logical overwriting is performed at an NWA of the user data area, the replacement recording may be performed in two different cases, i.e., when the SRR is open and when the SRR is closed. First of all, in the SRM type, an open SRR is an area still having an unrecorded or recordable area and has an NWA corresponding to the beginning of the unrecorded area. A closed SRR is a completely recorded SRR or an SRR where recording is no longer allowed, for example due to a user request, even though recordable area may still remain in the SRR. An NWA does not exist within the closed SRR. Accordingly, when a data overwriting command for a pre-recorded area within an open SRR (SRR #n) is transmitted, the data that is to be recorded in the pre-recorded area is either recorded at an NWA of the present (or current) open SRR or replacement recorded at any one of the NWAs of the open SRRs.

Figure 4:
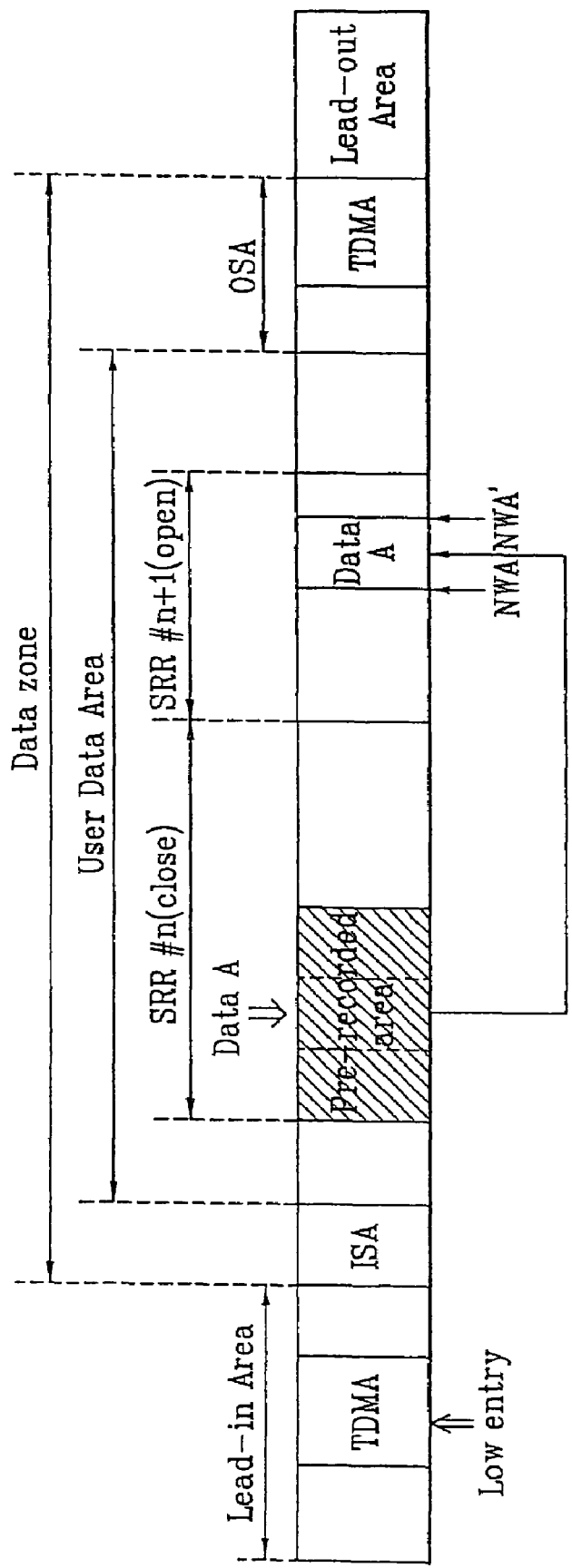
FIG. 4 illustrates an example of logical overwriting being performed on a closed SRR in the write-once optical disc according to an embodiment of the present invention.

FIG. 4 illustrates an example of logical overwriting being performed on a closed SRR in the write-once optical disc according to an embodiment of the present invention. Referring to FIG. 4, when the writing command given (or made) by the host is an overwriting command on a pre-recorded area in a closed SRR, since the closed NWA does not include any NWA as described above, the replacement recording is performed on an open SRR having an NWA. In other words, even when non-recorded area remains in the present closed SRR, the non-recorded area is not used as the replacement area. At this point, when overwriting data on the pre-recorded area of the closed SRR, the replacement recording may also be performed on a spare area. More specifically, in an open SRR and a closed SRR, replacement recording is performed in an NWA of the user data area. However, in the case of the closed SRR, the replacement recording may be specifically performed in a spare area instead of the user data area.

Figure 5:
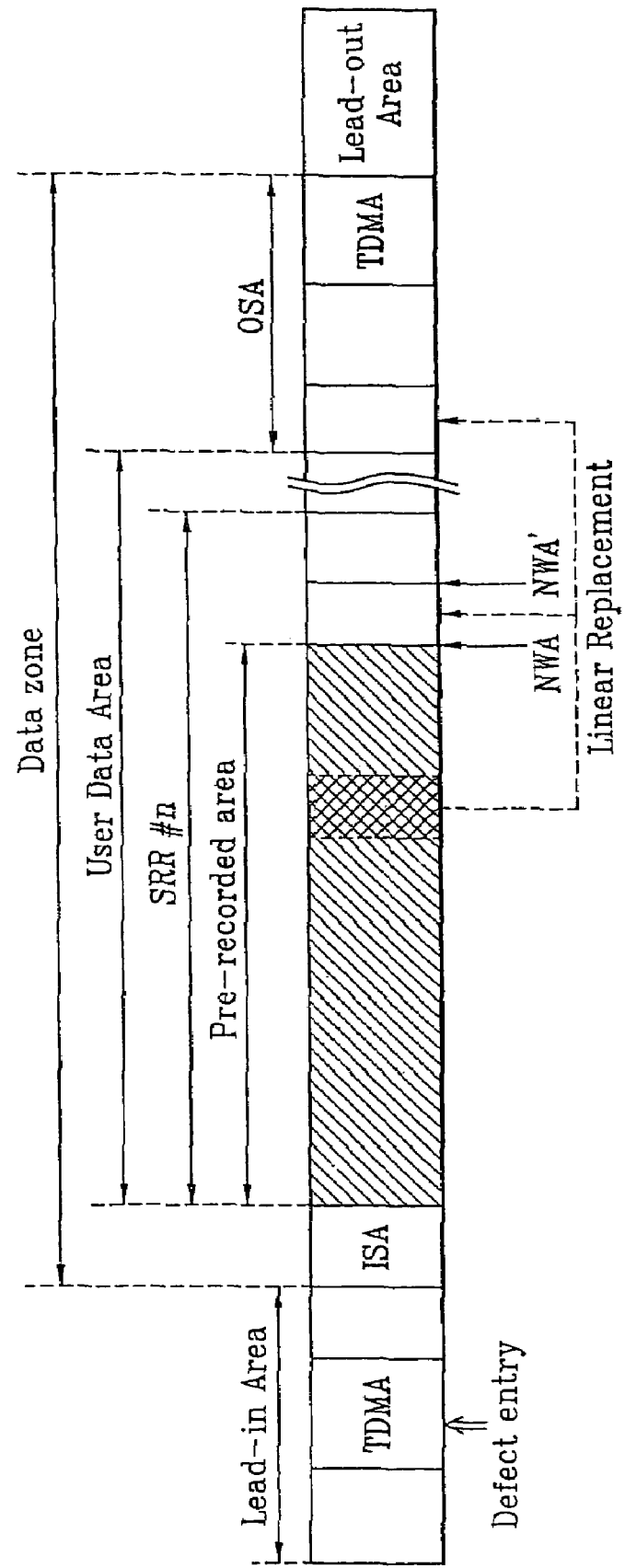
FIG. 5 illustrates a method for managing defects in the write-once optical disc according to an embodiment of the present invention.

FIG. 5 illustrates a method for managing defects in a write-once optical disc according to an embodiment of the present invention. Referring to FIG. 5, when a defect area exists within the write-once high density optical disc, data that is to be recorded on the defect area is either replacement recorded at an NWA of the user data area or replacement recorded in the spare area. More specifically, by replacement recording the data that is to be recorded in a defect area, which is a defect area that may be detected during recording (or writing) or reproduction (or reading) of the data, reliability and stability of the data can be ensured.

After performing the above-described replacement recording, the position information of the defect area and the replacement recorded area are recorded in the TDMA as RAD or CRD type defect entries. Thereafter, when the defect area is to be reproduced, reference is made to the defect entry information so as to reproduce the data of the replacement recorded area. The same is true when an overwritten area is to be reproduced.

As described above, logical overwriting or defect management is performed for the write-once high density optical disc according to the present invention. Because such operations may frequently occur during the usage of the disc, sufficient TDMA should be allocated in order to record the position information for logical overwriting and the position information for defect management. Accordingly, a method of allocating additional TDMA within the inner spare area (ISA) as well as the outer spare area (OSA) is used in the present invention, which will be described in detail with reference to FIG. 6.

Figure 6:
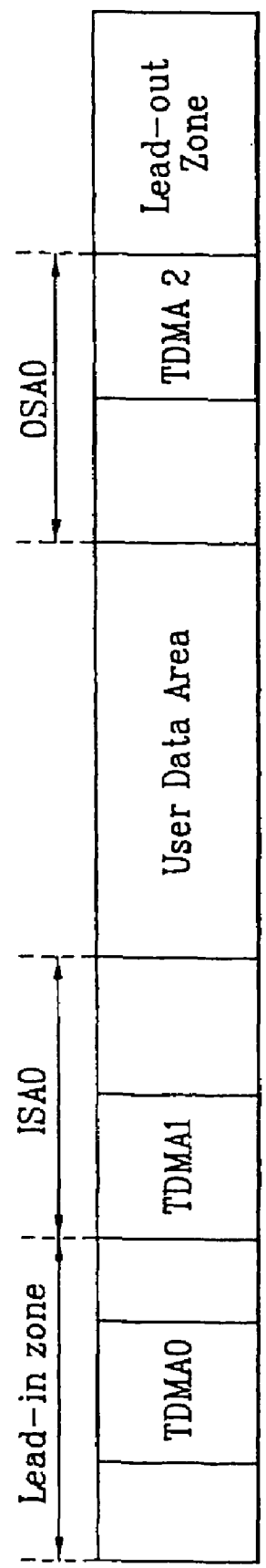
FIG. 6 illustrates a method for allocating TDMA in the write-once optical disc according to an embodiment of the present invention.

FIG. 6 illustrates a method for allocating TDMA in the write-once optical disc according to an embodiment of the present invention. Referring to FIG. 6, and also FIGS. 4 and 5, additional TDMA may be allocated in the spare area of the write-once high density optical disc. And, more particularly, the additional TDMA may be allocated in the inner spare area (ISA). The size of the TDMA is allocated to be smaller than the size of the spare area, wherein the size is allocated to be either 0 or ¼ of the size of the spare area such that the TDMA varies based on the size of the spare area.

Figure 7B:
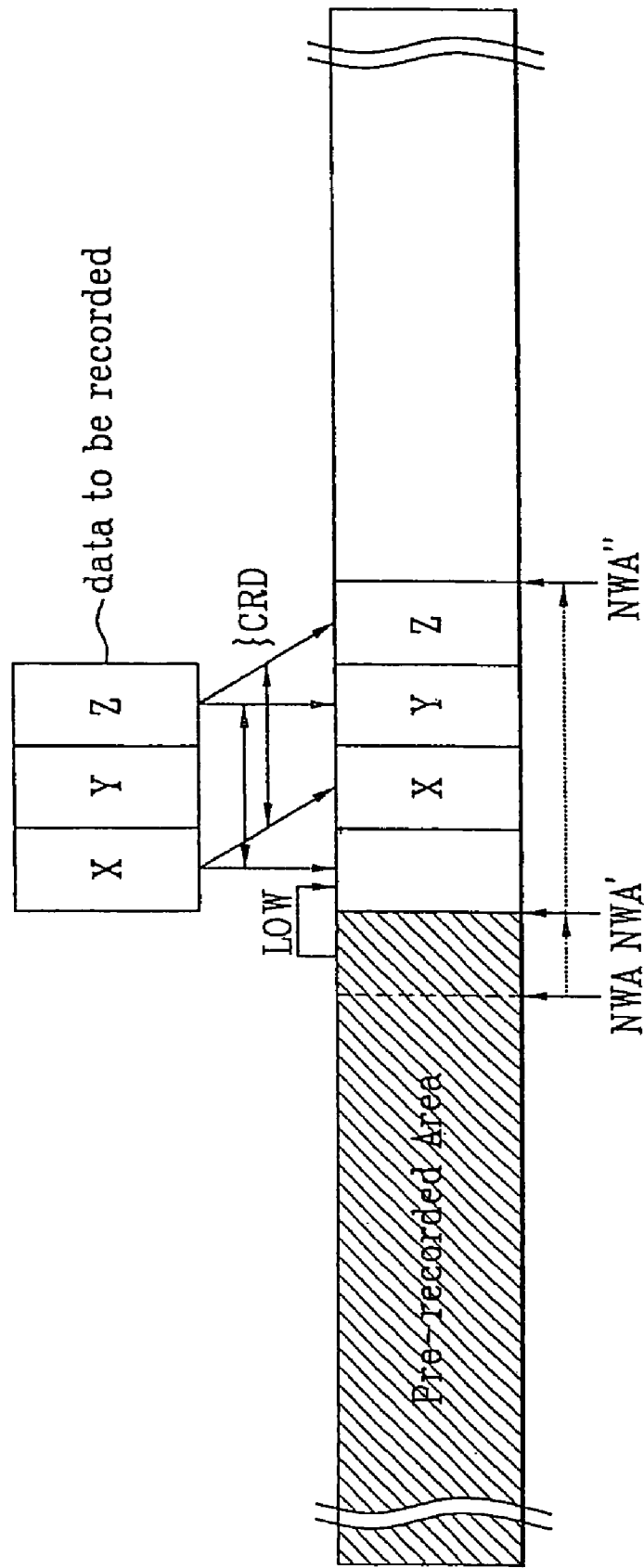
Figure 7C:
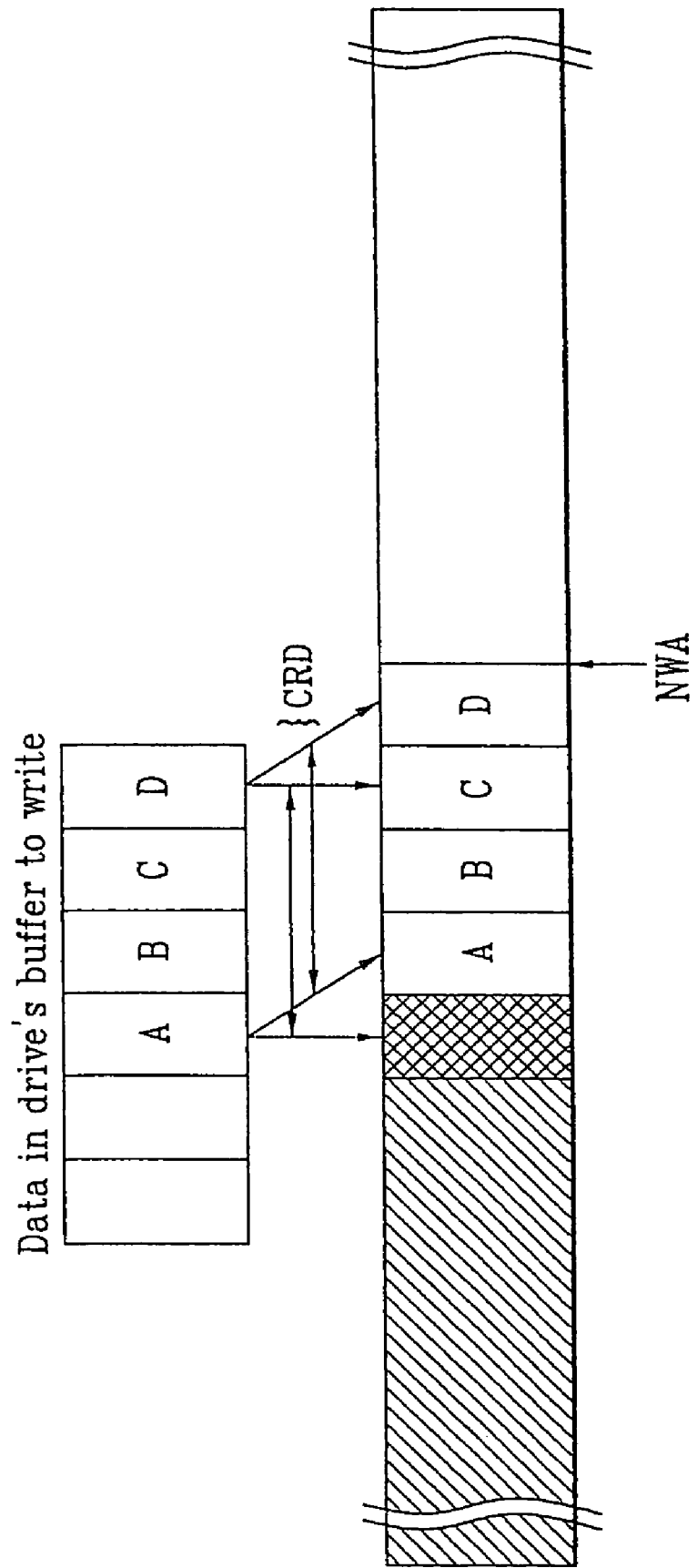

FIGS. 7A to 7C illustrate a method for logical overwriting and a method for managing defects in the write-once optical disc according to an embodiment of the present invention. More specifically, FIG. 7A illustrates a method for replacement recording when a defect area is detected. FIG. 7B illustrates a method for replacement recording in accordance with logical overwriting. And, FIG. 7C illustrates a method for replacement recording of data during stream recording.

Referring to FIG. 7A, a defect area may exist in an area wherein data X, Y, and Z are to be recorded in accordance with a command from the host. Each of data X, Y, and Z has the size of one cluster. As described above, when a defect area exists within the area in which data is to be recorded, the data is replacement recorded either on a next recordable (or writable) area or on a spare area. When the data is replacement recorded on a next recordable area, the data is sequentially recorded starting from the next recordable area (NWA') after skipping the defect area, as shown in FIG. 7A. After completing the replacement recording, position information of the replacement recording is recorded within the TDMA as a CRD entry. Therefore, when reproducing the data X, Y, and Z, reference is made to the CRD entry information so as to reproduce the replacement recorded data.

FIG. 7B illustrates a method for replacement recording in accordance with a logical overwriting. Referring to FIG. 7B, when data X, Y, and Z are to be recorded on a next recordable area (NWA) in accordance with a command from the host, the next recordable area (NWA) may already be an area wherein replacement recording of a logical overwriting is completed. More specifically, when the NWA has been moved (or relocated) due to the logical overwriting, without notifying the host, the data X, Y, and Z are recorded on a next recordable area (NWA') of the replacement recorded area (NWA). The NWA is moved (or replaced) without notifying the host because the logical overwriting is performed independently within the optical disc drive. Therefore, the NWA may be moved when the optical disc drive fails to notify (or report) the next recordable area to the host. After replacement recording the data X, Y, and Z as described above, the position information of the replacement recording is recorded in the TDMA as a CRD entry. Thereafter, when reproducing the data X, Y, and Z, reference is made to the CRD entry information so as to reproduce the replacement recorded data. Replacement recording may also be conducted in a spare area.

FIG. 7C illustrates a method for replacement recording of data during stream recording. Referring to FIG. 7C, in the write-once high density optical disc, when a defect is detected while stream recording real-time data such as broadcast programs or movies, wherein time flow is an important factor, the data is recorded on a non-defective area by skipping the detected defect area. The recording of data that is to be recorded in the defect area is treated identically as replacement recording of the data on a non-defective and recordable area. Information on the positions of replacement recorded data A, B, C, and D is recorded as a CRD entry. After recording the CRD entry, as described above, when reproducing data in a later process, reference is made to the CRD entry information so as to reproduce the data A, B, C, and D. And, this method is advantageous in that information on the defect area that is detected in the user data area is not required to be reported separately to host.

Figure 8:
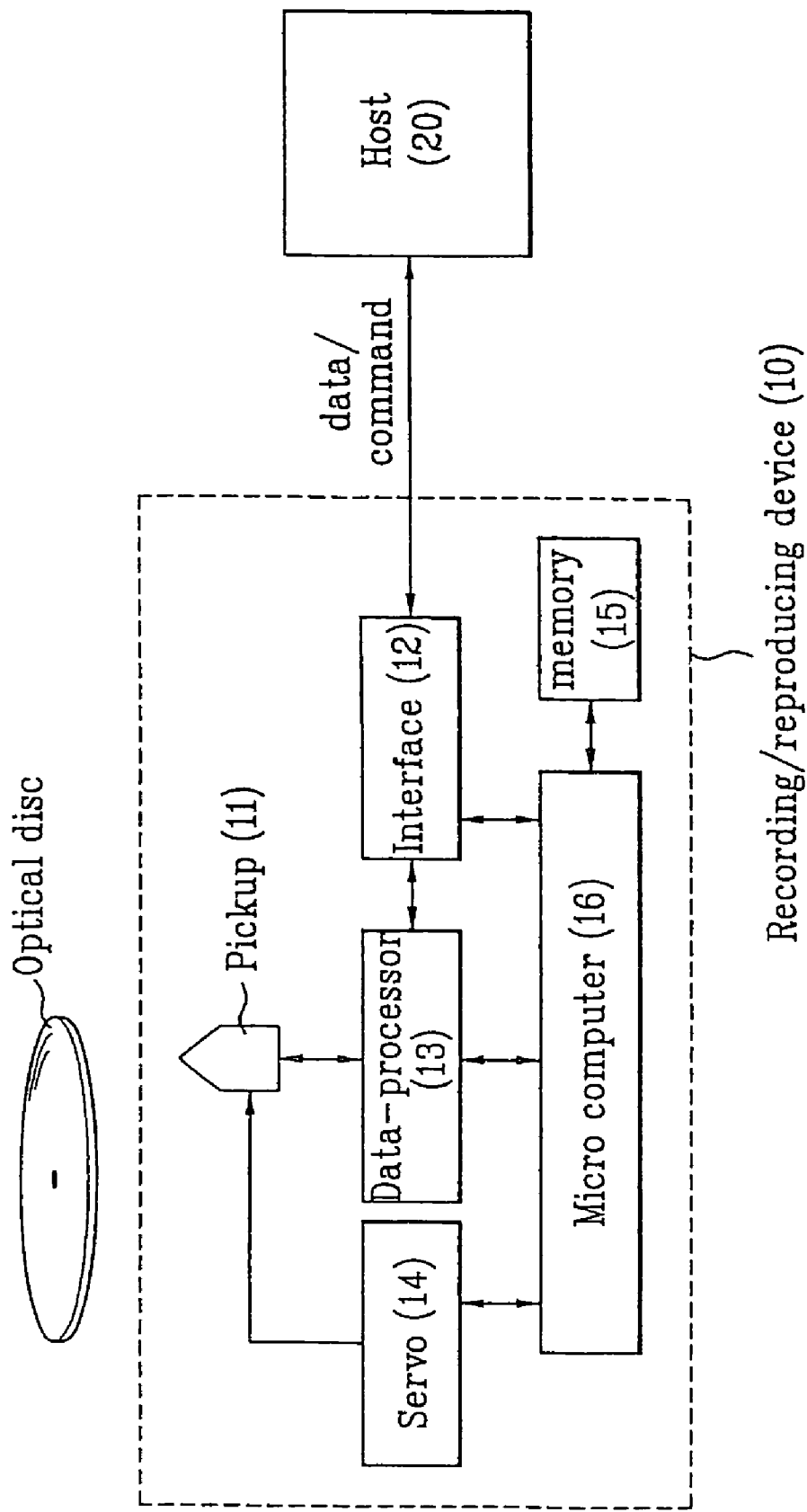
FIG. 8 illustrates a block diagram of an optical recording and reproducing apparatus according to an embodiment of the present invention.

FIG. 8 illustrates a block diagram of an optical recording and reproducing apparatus according to the present invention. Referring to FIG. 8, the optical recording and/or reproducing apparatus includes a recording/reproducing device 10 for performing recording/reproduction on the optical disc, and a host, or controller 20 for controlling the recording/reproducing device 10. (Herein, the recording/reproducing device 10 is often referred to as an "optical disc drive", and both terms will be used in the description of the present invention).

Basically, in the above-described optical recording and reproducing apparatus, the host 20 gives a writing or reproduction command to write or reproduce to/from a particular area of the optical disc to the recording/reproducing device 10, and the recording/reproducing device 10 performs the recording/reproduction to/from the particular area on the optical disc in response to the command from the host 20. The recording/reproducing device 10 includes an interface unit 12 for performing communication, such as exchanges of data and commands, with the host 20; a pickup unit 11 for writing/reading data to/from the optical disc directly; a data processor 13 for receiving a signal from the pickup unit 11 and recovering a desired signal value, or modulating a signal to be recorded into a signal that can be written on the optical disc; a servo unit 14 for controlling the pickup unit 11 to read a signal from the optical disc accurately, or write a signal on the optical disc accurately; a memory 15 for temporarily storing diverse information including management information and data; and a microcomputer 16 for controlling various parts of the recording/reproducing device 10.

In the optical recording and/or reproducing apparatus, process steps of an embodiment of the method for recording data on the recordable (e.g., a write-once) optical disc will now be described. Upon inserting the recordable optical disc into the optical recording and/or reproducing apparatus, management information is read from the optical disc and stored in the memory 15 of the recording/reproducing device 10. Herein, if the user desires to write on a particular area of the optical disc, the host 20, which responds to a writing command indicating this desire, provides information on a desired writing position to the recording/reproducing device 10, along with a set of data that is to be written.

The microcomputer 16 in the recording/reproducing device 10 receives the writing command, and determines (i) whether the area of the optical disc in which the host 20 desires to write the data is a defective area or not and/or (ii) whether the area has already been recorded on based on the management information stored in the memory 15. Then, the microcomputer 16 performs data writing according to the writing command from the host 20 on an area which is neither the defective area nor a recorded area. For example, if the area is in a closed SSR or has a starting address less than the LRA of the SSR to be written, then the area is determined as already recorded.

While performing writing of data as described above, when overwriting or defect management is to be performed in accordance with the user command, the data that is to be recorded (or written) on the overlapping (or overwriting) area or the defect area is replacement recorded in another area within the data zone, such as the user data area or the spare area, as described above with respect to one of the embodiments of the present invention. Then, corresponding management information including RAD and CRD entries that are created during this process are recorded in the TDMA, for example, within the lead-in area. For this, the microcomputer 16 provides the position information of the replacement recorded area and the data to the servo unit 14 and the data-processor 13, so that the recording or replacement recording is completed at a desired position on the optical disc through the pickup unit 11.

Hereinafter, a method for reproducing data, which is recorded as described above, from the optical disc according to the present invention will be described in detail. When the write-once optical disc, wherein the data is recorded, is inserted into the optical recording and/or reproducing apparatus, management information is read from the optical disc and stored in the memory 15 of the recording/reproducing device 10, for use at the time of recording/reproduction data to/from the optical disc.

Herein, if the user desires to read (or reproduce) data from a particular area of the optical disc, the host 20, which responds to a reading command indicating this desire, provides information on a desired reading position to the recording/reproducing device 10. The microcomputer 16 in the recording/reproducing device 10 receives the reading command, and using the management information determines whether the area of the optical disc from which the host 20 desires to read the data from is an area that has been replaced. If so, the microcomputer 16 determines a position of the replacement area from the management information. However, when replacement recording has not been performed, the microcomputer 16 reads (or reproduces) the data of the indicated area and transmits the read information to the host 20. If replacement recording (e.g., RAD/CRD type) has been performed, the microcomputer 16 reads the data from the determined replacement area and transmits the read information to the host 20.

As described above, the method and apparatus for recording and reproducing data on/from a recording medium according to the present invention provides a method for logical overwriting data and a method for managing defects such that the write-once recording medium can be more efficiently managed and reproduced.

While the invention has been disclosed with respect to a limited number of embodiments, those skilled in the art, having the benefit of this disclosure, will appreciate numerous modifications and variations there from. For example, while described with respect to a Blu-ray write-once optical disk in several instances, the present invention is not limited to this standard of write-once optical disk, to write-once recording media or to optical discs as the recording medium. It is intended that all such modifications and variations fall within the spirit and scope of the invention.

What is claimed is:

1. A method of recording data onto a recording medium having a user data area divided into one or more recording ranges, comprising steps of:
   (a) notifying a next recordable position of a recording range to a host;
   (b) performing a replacement for data requested to be recorded at a first area of the recording range by recording sequentially the data requested onto a second area starting from the next recordable position instead of the first area, the first area having recorded data and the second area not having recorded data; and
   (c) recording onto a temporary defect management area of the recording medium a management information entry, the management information entry indicating the first and second areas and including first and second status indicators indicating a status of the management information entry, the first status indicator indicating that the replacement is performed and the second status indicator indicating a type of the replacement.

2. The method of claim 1, wherein the type of the replacement is one of single data unit replacement type and continuous data unit replacement type.

3. The method of claim 2, wherein a data unit is a cluster.

4. The method of claim 3, wherein the next recordable position is an unrecorded cluster directly subsequent after the last sector having recorded data in the recording range.

5. The method of claim 4, wherein the next recordable position is moved in accordance with the step of (b) without notifying to the host.

6. The method of claim 1, wherein the management information entry indicates the first and second areas by including a first physical sector number of the first area and a first physical sector number of the second area.

7. The method of claim 6, wherein if the second status indicator indicates the type of the replacement is continuous, then the step of (c) records a first management information entry and a second management information entry, the first management information entry including information indicating a first data unit in the first area and a first data unit in the second area and the second management information entry including information indicating a last data unit in the first area and a last data unit in the second area.

8. An apparatus for recording data onto a recording medium having a user data area divided into one or more recording ranges, comprising:
   a interface unit configured to communicate with an external host;
   a pickup configured to write/read data to/from the recording medium directly;
   a data processor configured to receive and recover a signal from the recording medium or modulate a signal to be recorded into a signal that can be written on the recording medium;
   a servo configured to control the pickup to read/write accurately a signal from/to the recording medium;
   a memory configured to store information temporarily; and
   a microcomputer configured to notify a next recordable position of a recording range to the host and control the interface unit, the pickup, the data processor, the servo and the memory such that the apparatus:
      performs a replacement for data requested to be recorded at a first area of the recording range by recording sequentially the data requested onto a second area starting from the next recordable position instead of the first area, the first area having recorded data and the second area not having recorded data; and
      records onto a temporary defect management area of the recording medium a management information entry, the management information entry indicating the first and second areas and including first and second status indicators indicating a status of the management information entry, the first status indicator indicating that the replacement is performed and the second status indicator indicating a type of the replacement.

9. The apparatus of claim 8, wherein the type of the replacement is one of single data unit replacement type and continuous data unit replacement type.

10. The apparatus of claim 9, wherein a data unit is a cluster.

11. The apparatus of claim 10, wherein the microcomputer is configured to notify the host of an address of an unrecorded cluster directly subsequent after the last sector having recorded data in the recording range as the next recordable position of the recording range.

12. The apparatus of claim 11, wherein the microcomputer is configured to move the next recordable position without notifying to the host in accordance with the replacement.

13. The method of claim 8, wherein the management information entry indicates the first and second areas by including a first physical sector number of the first area and a first physical sector number of the second area.

14. The apparatus of claim 13, wherein if the second status indicator indicates the type of the replacement is continuous, the microcomputer is configured to control the interface unit, the pickup, the data processor, the servo and the memory such that the apparatus:

records a first management information entry and a second management information entry, the first management information entry including information indicating a first data unit in the first area and a first data unit in the second area and the second management information entry including information indicating a last data unit in the first area and a last data unit in the second area.

15. The apparatus of claim 8, wherein the microcomputer is configured to receive from the host a command requesting the apparatus to record data at the first area, and control the interface unit, the pickup, the data processor, the servo and the memory, in response to the command from the host.

* * * * *